1,632,208

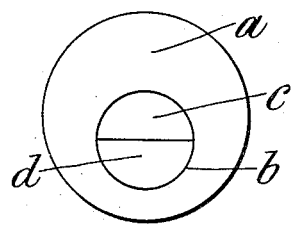
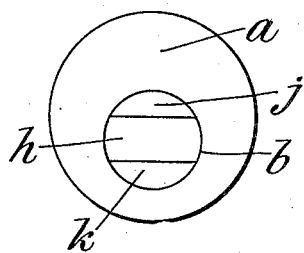
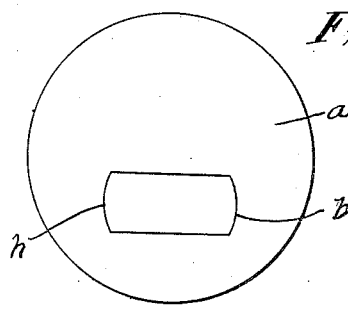
INVENTORS:
FRANK BRUCE WATSON
EDWARD CULVER,
By their Attorneys, Patented June 14, 1927.

UNITED STATES PATENT OFFICE.

FRANK BRUCE WATSON AND EDWARD CULVER, OF LONDON, ENGLAND, ASSIGNORS TO UNITED KINGDOM OPTICAL COMPANY, LIMITED, OF LONDON, ENGLAND.

LENS.

Application filed November 21, 1925, Serial No. 70,586, and in Great Britain April 29, 1925.

This invention relates to lenses particularly those which are used with spectacles and the like.

In the manufacture of fused lenses as is usually practised a circular plate of glass of greater refractive index than that of the main lens is fused into the main lens. It is found in practice that the lower part of the plate is little if at all used for reading purposes and it is the lower portion which prevents the wearer from seeing the ground. It has also been found that the upper portion of the plate is little if at all used in reading and that the eye adjusts itself to the use of a comparatively narrow part of the circle which is of greater width, that is to say a part on each side of the horizontal diameter of the circle.

According to this invention we form a plate of glass of a plurality of pieces of glass of different refractive indices, that is to say of pieces of glass one of which is suitable for forming a reading portion and has generally a greater refractive index than the other portion or portions and the other portion or portions have substantially the same refractive index as that of the main lens. The plate may be of two pieces of glass and is circular, the upper portion of the plate generally being of greater refractive index than the lower and suitable for forming a reading portion. Preferably however the plate is made in three parts, a central portion and two segments. The central portion has a refractive index greater than that of the other portions and is suitable for forming a reading portion.

In making a lens the central portion and the two segments are fused together to form a circular plate of glass, the edges of the central portion and the segments being grey and unpolished in order to prevent the dividing lines between them being reflecting. The plate of glass is secured to the main lens in any usual manner, for instance the plate is fused on to the main lens and then ground and polished.

In the accompanying drawings Figures 1 and 2 are plans of two lenses made in accordance with this invention; and Figure 3 is a plan view of the completed lens.

*a* is the main lens or countersink. In Figure 1 *b* is a circular plate formed of two parts *c* and *d*, the part *c* being of greater refractive index than the part *d*, and is suitable for reading, whilst the part *d* has substantially the same refractive index as the lens *a*. In Figure 2 the circular plate *b* is formed in three parts, one part *h* having a refractive index greater than the two segments *j*, *k*, whose refractive index is substantially the same as that of the main lens.

The edges of the parts of the plate *b* are left grey and unpolished to prevent their becoming reflecting surfaces, and are fused together and the plate so formed is fused to the main lens. By countersink we mean a glass blank having a cut-away portion adapted to receive the insert or button. By zonal or a zonal insert we mean an insert having a spherical surface and having a top and bottom consisting of sides formed in parallel planes.

What we claim is:—

1. A lens consisting of a main lens, a glass plate secured to the main lens consisting of three pieces of glass made of a central portion and two segments, the central portion having a refractive index suitable for reading whilst the two segments have the same refractive index as that of the main lens.

2. In a fused bifocal lens, a countersink of one refractive power and a fused zonal insert of a different refractive power.

3. In a fused bifocal lens, a countersink of one refractive power, a fused insert of a different refractive power having a relatively wide lateral field of vision, the vision field above and below said insert being relatively large as compared with its extent on either side of said insert.

4. In a fused bifocal lens, a countersink of one refractive power and a fused zonal insert of a different refractive power, said insert having unpolished edges where such edges join and are fused to said countersink.

5. A bifocal lens, consisting of a major field, and a zonal minor field, the vision field above and below said minor field being relatively large as compared with its extent on either side thereof.

In testimony that we claim the foregoing as our invention we have signed our names this 29th day of October, 1925.

FRANK BRUCE WATSON.
EDWARD CULVER.